Aug. 23, 1966  G. C. CHAPMAN  3,268,321
APPARATUS FOR FORMING SOLID GLASSWARE IN A CARBON DIE
Filed Feb. 25, 1963  4 Sheets-Sheet 1
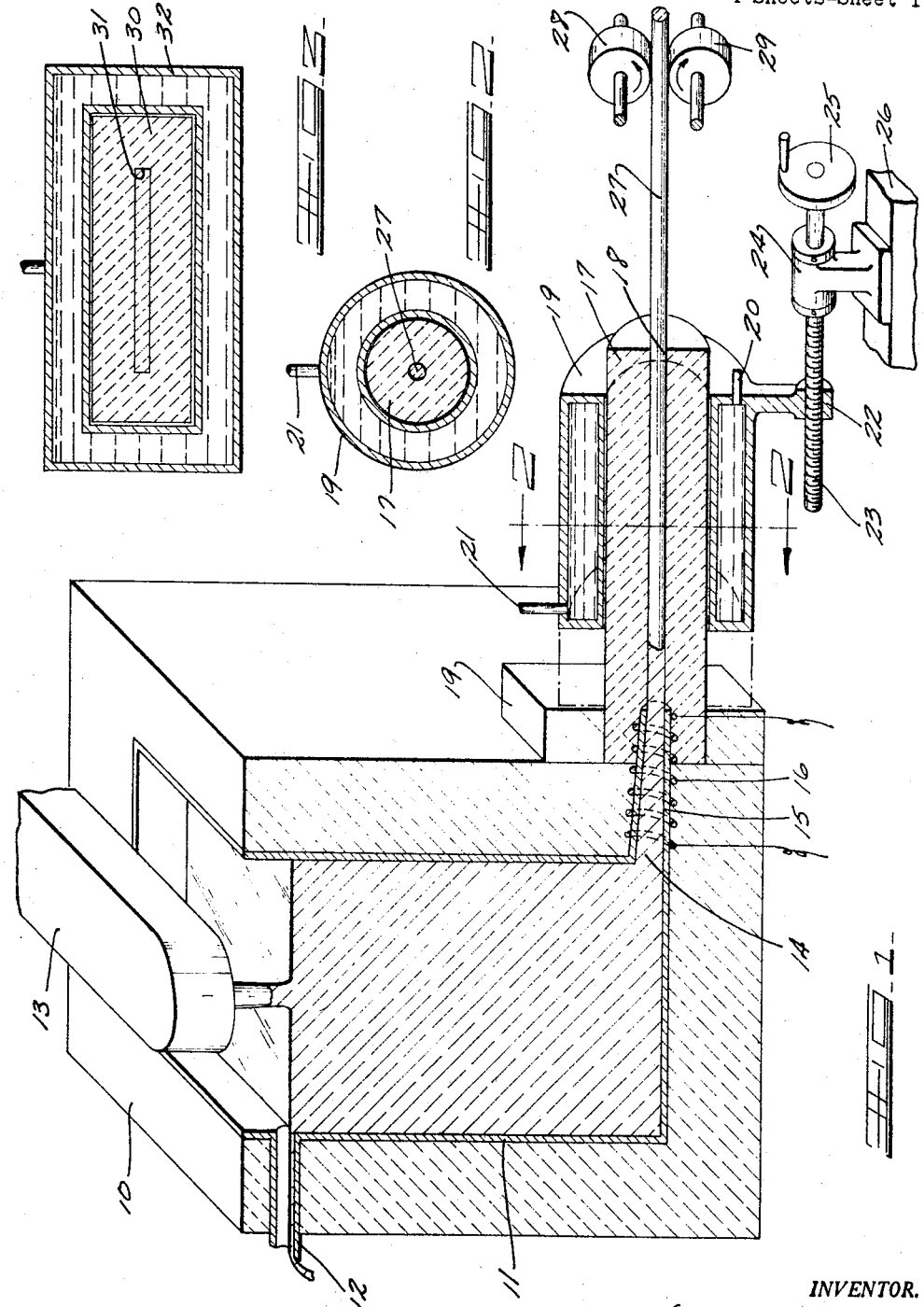
INVENTOR.
GEORGE C. CHAPMAN
BY
ATTORNEYS

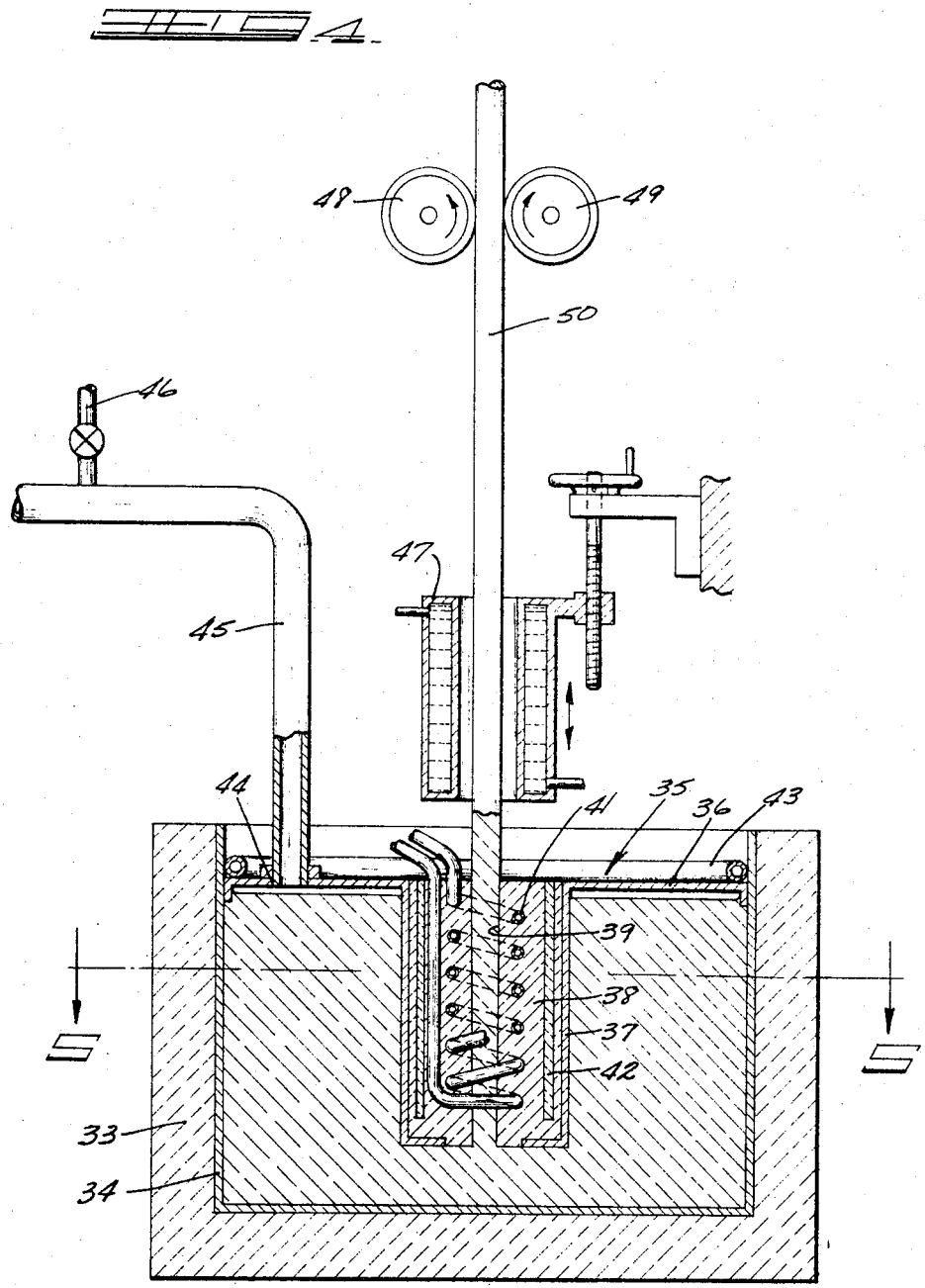

INVENTOR.
GEORGE C. CHAPMAN

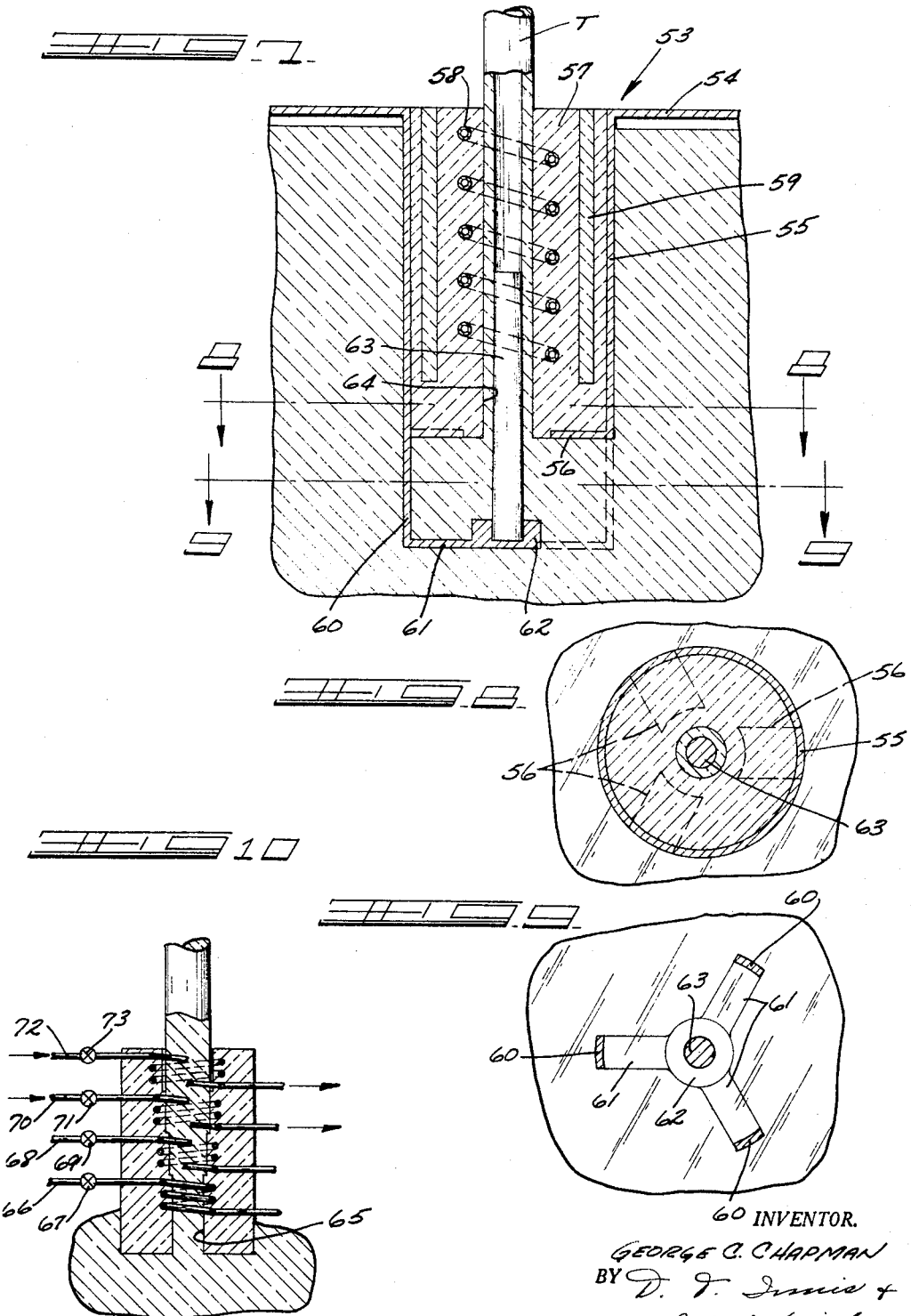

United States Patent Office 3,268,321
Patented August 23, 1966

3,268,321
APPARATUS FOR FORMING SOLID GLASSWARE
IN A CARBON DIE
George C. Chapman, Toledo, Ohio, assignor to
Owens-Illinois Inc., a corporation of Ohio
Filed Feb. 25, 1963, Ser. No. 260,684
5 Claims. (Cl. 65—183)

This invention relates to a method and apparatus for precision forming of glass articles. More particularly, this invention relates to a method and apparatus for continuously forming glass rod, sheet, bar or tubing.

This invention further relates to a method and apparatus for forming glass articles having symmetrical configuration either continuously or intermittently.

In the past, it has been the practice to form glass rod, sheet or tubing without precise control and to then select from a large production run those parts of the production run which meet the specifications as to thickness, diameter, etc.

In those situations where it is necessary to form glass articles having precise, exact dimensions, it is sometimes necessary to grind the glass after it has been cooled. It is exeremely difficult, if not impossible, to continuously form glass articles such as rod, sheet or tubing, wherein all of the production has precise and predetermined dimensions. In particular, when glass rod is formed in present day processes, and it is desired to form rod having a precise diameter, it is necessary to form a great deal more rod than required and to then select, by gauging, those portions of the formed rod which conform to the exact dimension desired.

With the foregoing in view, it is an object of this invention to form symmetrical glass articles of indefinite length on a continuous or intermittent basis, with precise dimensional control.

It is an additional object of this invention to provide apparatus for forming solid glass rod from molten glass in which the rod has a precise diametral dimension throughout its entire length.

It is a further object of this invention to provide apparatus for forming glass bars or glass sheets in which the formed glass has predetermined, precise thickness and width dimensions.

It is a still further object of this invention to provide a method and apparatus for precision forming of glass rod, sheet or tubing of a predetermined selected outside dimension, wherein the apparatus and process is adjustable to produce glass articles within a range of precise dimensions.

Other and further objects will be apparent from the following description taken in conjunction with the annexed sheets of drawings, wherein:

FIG. 1 is a cross-sectional elevation of one embodiment of the rod forming apparatus of the invention;

FIG. 2 is a cross-sectional view taken at lines 2—2 of FIG. 1.;

FIG. 3 is a cross-sectional view similar to FIG. 2, illustrating an alternate configuration of the graphite die of FIG. 1 used for forming sheets or bars of glass;

FIG. 4 is a cross-sectional elevation of a second embodiment of the rod forming apparatus of the invention;

FIG. 7 is a cross-sectional elevation of a third embodiment of the invention, illustrating the apparatus for forming tubing;

FIG. 8 is a cross-sectional view taken at line 8—8 of FIG. 7;

FIG. 9 is a cross-sectional view taken at line 9—9 of FIG. 7;

FIG. 10 is a cross-sectional elevation of a fourth embodiment of the rod forming apparatus of the invention wherein rod of different diameters may be selectively produced.

Figure 5:
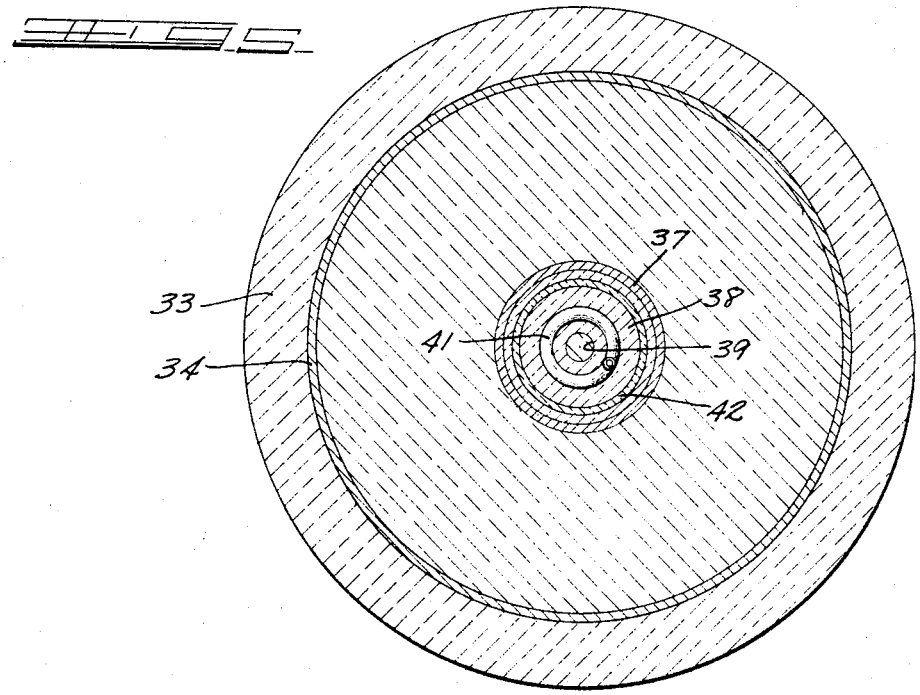
FIG. 5 is a cross-sectional view taken at line 5—5 of FIG. 4.

Throughout the description of this application, the term "rigid glass" will be used and it should be kept in mind that this term means that the glass is at such a temperature that it cannot be deformed or it is carefully maintained at a low temperature so that it will not change its shape after it is formed. The particular term is used with reference to the condition of the glass as it leaves the forming die. Thus, it should be understood that the glass is either completely cooled to the extent that it is solid all the way through, or is sufficiently chilled on its exterior surface so that the internal portion of the formed glass article, while it still may be slightly molten, will not have sufficient heat therein to reheat the skin to the point where the skin would become soft and alter the shape thereof.

Furthermore, it should be understood that the viscosity of the glass within the reservoir from which it is being discharged will be at approximately log 2 or less and the temperature of the glass in the reservoir is maintained above the liquidus temperature for the particular glass. As the glass issues from the graphite or carbon die, it must be at approximately log 8 viscosity, at which time it is "rigid."

While the entire cross-section of the glass rod or bar need not be solid, it is necessary that the outside surface adjacent the die be rigid and remain rigid until the glass inside cools sufficiently to set up. Thus, it may be that the center portion of the article, as it issues from the die, may be at a viscosity less than log 8. The temperatures for the process are dependent upon the particular glass which is being melted and formed and the viscosity curve for each glass will necessarily have to be adjusted accordingly. It should be mentioned that the process of the invention is especially suited to glasses which are susceptible to devitrification because the glass reservoir is held above the liquidus temperature and the cool-down rate in the die is made quite rapid through the liquidus temperature.

With particular reference to FIGS. 1 and 2, apparatus for forming glass rod in accordance with the first embodiment of the invention will be described.

A reservoir 10 in the form of an open-top chamber is made of a suitable refractory material and lined with a heat resistant metal 11, such as a platinum-rhodium alloy. An overflow opening 12 is formed in the side of the reservoir adjacent the top thereof and provides a means for maintaining a constant head of molten glass within the reservoir. A forehearth 13, which is in communication with a glass melter in the usual manner, has its orifice positioned over the top of the reservoir and, in operation, molten glass issues from the forehearth and is continuously supplied to the reservoir, thus serving to replenish the reservoir and maintain the level of molten glass therein. Obviously, the forehearth feeding may be controlled in any conventional manner so as to cut off the flow of molten glass to the reservoir when rod is not being formed. At the bottom of the reservoir an opening 14 is formed in the reservoir and a transfer tube 15 is positioned within this opening and may be made integral with the liner 11 of the reservoir. The transfer tube is surrounded by an electrical heater coil 16, thus providing induction heating to the transfer tube and the molten glass therein. The transfer tube is slightly tapered and, as shown in FIG. 1, the smaller end thereof extends within one end of a carbon or graphite die 17. The bore 18, through the graphite or carbon die, is precisely cut and its dimension constant throughout the length of the die. The die is held in a horizontal position by block 19 of refractory material similar to that which forms the insulating body of the reservoir 10. It should be understood that the transfer tube end which extends within the graphite die conforms to the precise bore of the die.

The die 17 is cylindrical in shape and an annular cooling chamber 19 is mounted in surrounding relationship with respect to the die. The cooling chamber has an inlet 20 and an outlet 21, thus affording means for continuously flowing a cooling fluid, such as water, through the chamber 19. The chamber may be formed of metal and has a downwardly extending flange 22 which is internally threaded to receive a threaded shaft 23. The threaded shaft is supported by a bearing house 24 and carries a crank wheel 25 fixed to one end thereof. The bearing house is mounted to a fixed support 26. Thus, it can be seen that rotation of the wheel 25 will rotate the shaft 23 and adjustably position the cooling chamber 19 axially with respect to the die 17. In this manner the glass rod 27, being formed within the die 17, may be made rigid within the die at a selected point in the travel of the rod as it is being formed through the die.

A pair of rollers 28 and 29, positioned down-stream of the rod as it issues from the die, are rotated by conventional driving means (not shown), thus serving to draw the rod from the die 17. It should be understood that the rate at which the rollers are driven depends upon the rate at which the rod is being formed rigid.

Thus, it can be seen that in the operation of the device shown in FIG. 1, that molten glass is supplied to the reservoir and the temperature of the glass within the reservoir is maintained above the liquidus temperature and the molten glass will flow from the reservoir through the transfer tube 15. In order to prevent the glass from changing its viscosity during the transfer from the reservoir to the graphite die, the tube 15 is provided with induction heating.

In starting the formation of glass rod, it is necessary to insert a metal rod or bait into the bore of the die 17 to the point that it will contact the molten glass within the transfer tube 15. The glass will adhere to the rod which is then withdrawn from the die, thus drawing the glass therethrough. As the glass leaves the bore of the die 17, it will be "rigid" by reason of the fact that the cooling chamber 19, which provides the carbon die 17 with an axial temperature gradient, will cool the glass rod to the point where its viscosity is approximately log 8.

The adjustability of the cooling chamber is desirable from the standpoint that it is necessary to maintain a temperature gradient throughout the length of the die 17 which is adequate to permit glass entering the die to be above the liquidus but to chill the glass sufficient to make it rigid before leaving the die. It is, therefore, necessary to be able to adjust the axial position of the chamber. Obviously, when working with glasses which have different liquidus temperature, the amount of heat to be extracted from the glass will vary.

After the production of a certain amount of rod, it may be desirable to discontinue the drawing of the rod until a later period. Thus, it is only necessary to stop drawing the rigid rod from within the die and the rod itself then effectively serves as a plug for preventing any additional glass from leaving the reservoir. When additional production is then required, it is only necessary to start drawing the rod again.

Thus, it can be seen that with the apparatus of FIG. 1, continuous formation of glass rod of extremely precise diameter may be accomplished, or if it is desirable to operate the apparatus to form rod on a semi-continuous or intermittent basis, the apparatus lends itself to such operation.

It should be understood that FIG. 3 corresponds to FIG. 2 and illustrates the cross-sectional configuration of a die for forming sheet or bar glass.

With reference to FIG. 3, a variation of the apparatus of FIGS. 1 and 2 is illustrated. When drawing glass sheets or bars a carbon die 30 will have a rectangular opening 31 therein. Thus the outer contour of the die 30 will also be rectangular and a water or cooling chamber 22 will conform to this configuration and likewise be rectangular. It can readily be seen then, when using the variant illustrated in FIG. 3, in place of the die shown in FIG. 1, the opening in the bottom of the reservoir will be generally rectangular in shape and the transfer tube likewise will be of rectangularly shaped cross-section and tapered from a slightly larger size to a smaller size which will conform to the opening 31 formed in the die 30.

The operation and function of the variant in FIG. 3 will be substantially identical to that above described with respect to FIG. 1, it being understood that positioning of the cooling chamber 32 and the rate of draw of the sheet or bar of glass being formed will vary depending upon the requirements that the glass be rigid as it leaves the opening of the die.

Referring now to FIGS. 4 and 5, the second embodiment of the apparatus for precision forming of solid glass articles will be described.

Figure 6:
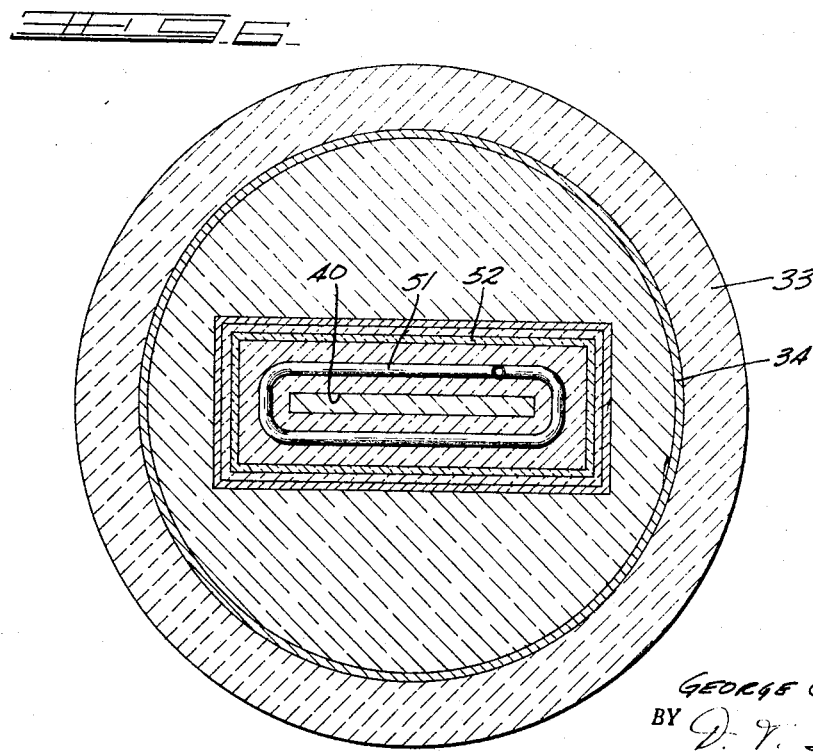
FIG. 6 is a cross-sectional view similar to FIG. 5, illustrating an alternate configuration of the graphite die of FIG. 4 when forming sheets or bars of glass.

The particular apparatus illustrated in FIGS. 4–6 is of the type in which molten glass is contained within a reservoir or crucible 33 and it is understood that the glass is melted and fined within this crucible. The crucible may be formed of refractory material having a platinum or platinum-rhodium alloy lining 34. It should be understood that suitable heating means (not shown) are provided for melting and fining the glass within the crucible 33. The crucible, as shown in FIGS. 4 and 5, is circular in cross-section with a platinum insert, generally designated 35, having the same configuration as the crucible within which it is adapted to be inserted. The insert 35 has a flat portion 36 and a downwardly projecting cylindrical portion 37. The lower end of the cylindrical portion 37 is turned inwardly and serves to support a graphite or carbon die 38. The carbon die is protected from the platinum with a coating of alundum. This coating is desirable and necessary to prevent platinum contamination. The die 38 has a central opening therethrough which conforms to the shape of the article which is to be produced. For example, as shown in FIG. 5, the die has a cylindrical opening 39 therethrough and FIG. 6, which shows a variant of the die configuration, has a rectangular opening 40 therethrough. The die is formed with a spiral pipe 41 imbedded therein, with the convolutions of the pipe encircling the opening in the die. The pipe surrounds substantially the full length of the die opening with only a small portion of the glass entrance end of the die being non-cooled. An insulating material 42 in the form of a cylinder is imbedded in the carbon die in the area between the pipe 41 and the platinum sleeve or cylindrical portion 37 which encloses the die. This insulating material 42 serves to prevent the cooling water, air or other suitable cooling medium which is circulated through the pipe 41, from chilling the body of molten glass contained within the crucible 33. A pipe 43 is co-extensive with the outer edge of the flat portion 36 of the platinum insert and is adapted to serve as a cooling means for the edge of the insert 35. An opening 44 formed in the flat portion 36 of the insert has a pipe 45 connected thereto. A valved vent passage 46 is connected to the pipe 45. The function of the pipe 45 will be described hereinafter.

A vertically adjustable water cooled chamber 47, which is cylindrical in shape, is positioned so that its central opening is in axial alignment with the opening formed in the die. It should be pointed out that the opening 39 through the die is slightly tapered from the bottom to the top so that as the rod is produced and made rigid within the die, the rigid rod will not frictionally engage the walls of the die opening beyond the point where it becomes rigid. Suitable rollers 48 and 49 are positioned above the chamber 47 and will engage the glass rod 50, being formed, and serve to draw the glass vertically upward.

In the operation of the apparatus of FIGS. 4 and 5, the glass is melted and fined in the crucible 33 and the insert 35 is then placed within the crucible in the position illustrated in FIG. 4. With the insert thus positioned, cooling fluid is circulated through the pipe 43, thus chilling the glass about the peripheral edge of the insert and forming a seal between the crucible and the insert. During the placing of the insert within the crucible, the vent pipe 46 is opened so as to prevent any air entrapment while the insert is being lowered into the crucible. After the insert is positioned and an effective seal provided by the chilling of the glass in the region of the edge of the insert, air or gas under pressure is introduced through the pipe 45 forcing the molten glass to move through the die cavity 39. As glass flows through the carbon die 38, it is cooled by the cooling coils or pipe 41 imbedded in the carbon. This cooling is effected by flowing water or other suitable coolant through the pipe 41 and the thickness of the carbon die and the placing of the insulating material behind the cooling pipe 41 prevents glass from chilling on the surface of the cylindrical portion 37 of the insert 35. As the glass issues from the upper end of the die cavity 39, it will pass through the water cooled jacket or chamber 47, thus preventing the rod from resoftening from external heat radiation or from reheating of the surface of the rod by internal glass which may still be slightly molten. The rollers 48 and 49 will assist in the drawing of the rod 25 from the die; however, the primary control on the rate at which the rod is to be produced is provided by the air pressure which is fed through the pipe 45.

It can readily be appreciated that the vertical position and size of the water cooled chamber or jacket 47 is dependent upon the total heat content of the rod as it is issuing from the die and the temperature to which the rod must be cooled in order to satisfy the requirements that it be rigid and remain rigid once it has been formed.

With reference to FIG. 6, there is illustrated an alternative structure for the die disclosed in FIG. 4 which has the rectangular opening 40 therein, it being assumed that this section would be taken on the modified FIG. 4 at the same section line as the FIG. 5 cross-sectional view. Fundamentally, the apparatus would be the same with an elongated spiral shaped cooling pipe 51, corresponding to the pipe 41 shown in FIG. 4, and the insulating material 52, corresponding in function to the insulating material 42 of FIG. 4.

With particular reference to FIGS. 7–9, the third embodiment of the invention will be described.

It should be understood that the embodiment shown in FIG. 7 would fundamentally be similar to FIG. 4 in all respects except that the platinum insert is modified to the extent necessary to provide a structure for forming hollow glass tubing. A platinum insert, generally designated 53, is formed of a flat portion 54, identical in construction to the flat portion 36 previously described in connection with FIG. 4. The insert also has a downwardly extending cylindrical portion 55 formed of platinum with integrally formed inwardly extending tabs 56, of which there are 3 shown on FIG. 8. These tabs are adapted to fit within recesses formed in the bottom of a carbon or graphite die 57. The die 57 has imbedded therein a spiral cooling pipe 58, similar to the pipe 41 of FIG. 4, and an insulating material 59 is positioned between the cooling pipe and the platinum, cylindrical portion 55 in the same manner and for the same purpose as the insulating material 42 of FIG. 4. The cylindrical portion 55 of the platinum insert has downwardly extending legs 60 which are connected together by a Y-shaped spider 61. The center of the spider 61 carries a socket member 62. This socket member 62 serves to support a mandrel 63 which extends vertically upward and is coaxial with the opening 64 through the center of the die 57. It should be noted that the mandrel 63 has a slight taper from its base toward its apex so that as the glass is cooled during passage between the mandrel and the die 57, the contraction of the glass will not cause it to grip the mandrel and prevent continuous flow of glass through the die.

In operation, the platinum insert of FIG. 7 is lowered into the glass in the identical manner as described above with respect to FIG. 4 and the molten glass within the bath will be forced by air pressure into and through the area defined by the mandrel and the opening 64 of the die 57. The tubing "T" thus being formed will be nearly rigid by the time it has cleared the upper end of the mandrel 63 and will be completely rigid by the time it issues from the upper end of the die 57. In this manner tubing may be formed which has precise external and internal dimensions. This apparatus also is capable of continuous or semi-continuous operation. With the stopping of air pressure, used to force the glass through the die, the flow of glass therethrough will stop, and with the resumption of pressure on the molten glass bath, tubing will again be formed in a continuous manner. Again it should be emphasized that the molten glass is maintained above its liquidus temperature. When the glass is of the type which is subject to devitrification, the cooling of the tubing below the liquidus temperature is sufficiently fast so that substantial devitrification thereof will be prevented.

Turning now to FIG. 10, this figure illustrates an alternative die structure useable in place of the die 38 of FIG. 4, it being understood that this die would be mounted in an apparatus similar to that disclosed in FIG. 4, with the essential difference being that the bore 65, extending through the die, has four different diameters, with the smallest diameter being at the lower end of the die and the largest diameter being at the top of the die. As shown in FIG. 10, each different bore size has an individual cooling pipe surrounding it. For example, a cooling pipe 66 having a valve 67 in the inlet thereof surrounds the smallest diameter portion of the bore 65. A pipe 68 having a valve 69 in its inlet side surrounds the next largest diameter portion of the bore 65. A pipe 70, having a valve 71 in its inlet side, surrounds the third larger diameter portion of the bore 65 and a pipe 72, having a valve 73 in its inlet, surrounds the largest diameter portion of the bore 65. With the particular die structure of FIG. 10 it can readily be seen that rod may be produced having one of four diameters, depending upon the point in the axial flow through the die in which the rod is made rigid. As specifically shown in FIG. 10, valves 67 and 69 are shut, thus preventing flow of coolant through the pipes 66 and 68. However, the valve 71 is open, thus permitting coolant to flow through the pipe 70 and the glass, as it conforms to the diameter of this portion of the bore, will set up and become rigid and with the pipe 72 feeding coolant also to the region above this diameter, the additional cooling of the rod will prevent its reheating or insure that it remain rigid after leaving the die. The difference in diameters of the plural portions of the bore 65 throughout its height will be in the order of .002 inch. Thus, the diameter of the bore 65 at its lower end will be .006 inch smaller than the diameter of the upper end of the bore.

With this particular arrangement, the operator may selectively choose which diameter of rod it is desired to produce. It can also readily be seen that when one diameter rod has been produced in sufficient quantity, the apparatus may, without interruption to the flow of glass, be operated to form a different diameter of rod merely by selecting the proper introduction of cooling as between the pipes 66, 68 and 70.

While FIG. 10 specifically shows the forming of glass rod, it should readily be appreciated that the fundamental premise of providing a glass forming die having stepped dimension could be equally applied to the formation of glass bars, sheets or tubing.

While specific embodiments of this invention have been described above, it should be understood that modifica-

I claim:

1. Apparatus for precision forming of glass articles comprising an elongated carbon die having a precision cut opening therethrough, means for forcing molten glass into one end of said die opening with a predetermined pressure and means mounted in thermal transfer relationship with said die for cooling said die an amount sufficient to make the glass contained therein rigid prior to emergence from said die.

2. Apparatus for forming glass articles comprising an open topped molten glass receiving reservoir, an overflow channel in said reservoir adjacent the top thereof, means forming a horizontal opening adjacent the bottom thereof, a transfer tube positioned in said opening and having an end thereof extending out of said opening, a carbon die having a precision bore therethrough connected to the extending end of said transfer tube, means for forcing molten glass through said die, means surrounding said transfer tube for heating said tube to maintain the glass in said tube above the liquidus, and cooling means surrounding said die for quickly chilling the glass during its movement through the die to rigidify the glass prior to emergence from said die.

3. Apparatus for forming glass articles comprising an open topped reservoir containing molten glass, a generally flat, platinum insert having a peripheral configuration corresponding to the inner configuration of said reservoir, said insert being positioned in said reservoir at approximately the level of the molten glass therein, means mounted on said insert for chilling the peripheral edge of said insert, a platinum clad carbon die supported by said insert and having a precise vertical bore therethrough, means for forcing molten glass through said die, cooling means in said die providing a vertical, temperature gradient with respect to said die bore, said cooling means rigidifying the glass prior to emergence from said die, and means connected to said insert for applying fluid under pressure between said insert and the molten glass in said reservoir.

4. Apparatus for forming glass articles comprising an open topped reservoir containing molten glass, a generally flat platinum insert having peripheral configuration corresponding to the inner configuration of said reservoir and positioned on the molten glass therein, means mounted on said insert for chilling the peripheral edge of said insert, a platinum clad carbon die supported by said insert and having a precise vertical bore therethrough, means for forcing molten glass through said die, cooling means in said die providing a vertical, temperature gradient with respect to said die bore, said cooling means rigidifying the glass prior to emergence from said die, means connected to said insert for applying fluid under pressure between said insert and the molten glass in said reservoir to force said molten glass through said die, and insulating means in said carbon die positioned between the cooling means and the external surface of said die for preventing cooling of molten glass in contact with the outside of said die.

5. Apparatus for forming glass articles comprising an open topped reservoir containing molten glass, a platinum insert having an external configuration corresponding to the configuration of said reservoir, said insert being positioned in said reservoir at approximately the level of the molten glass therein, means mounted on said insert for chilling the peripheral edge of said insert, a platinum clad carbon die depending from said insert and having a precise, stepped, vertical bore therethrough, means for forcing molten glass through said die, separate axially spaced cooling means included in said die corresponding to each step, means for selectively activating each of said cooling means to rigidify the glass prior to emergence from said die, means connected to said insert for applying fluid pressure between said insert and the molten glass in said reservoir and insulating means in said carbon die positioned between the cooling means and the external surface of said die for preventing cooling of molten glass in contact with the outside of said die.

References Cited by the Examiner

UNITED STATES PATENTS

| Re. 14,745 | 10/1919 | Hubbard et al. | 65—128 X |
|---|---|---|---|
| 720,517 | 2/1903 | Frink et al. | 65—327 |
| 820,971 | 5/1906 | Harvey | 65—188 |
| 966,753 | 8/1910 | Keefer | 65—326 |
| 1,239,024 | 9/1917 | Manning | 65—86 |
| 1,291,921 | 1/1919 | Keyes | 65—188 |
| 1,469,383 | 10/1923 | Crowley | 65—374 |
| 1,549,597 | 8/1925 | Miller | 65—66 |
| 2,190,296 | 2/1940 | Richardson | 65—325 |

DONALL H. SYLVESTER, *Primary Examiner.*

F. W. MIGA, *Assistant Examiner.*